United States Patent
Vishweshwara et al.

(10) Patent No.: US 8,661,374 B2
(45) Date of Patent: Feb. 25, 2014

(54) PLACEMENT AWARE CLOCK GATE CLONING AND FANOUT OPTIMIZATION

(75) Inventors: Ramamurthy Vishweshwara, Jayanagar (IN); Mahita Nagabhiru, Andhrapradesh (IN); Venkatraman Ramakrishnan, Kasturi Nagar (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/616,304

(22) Filed: Sep. 14, 2012

(65) Prior Publication Data
US 2013/0174104 A1    Jul. 4, 2013

(51) Int. Cl.
*G06F 17/50*    (2006.01)

(52) U.S. Cl.
USPC ............... 716/54; 716/55; 716/122; 716/129; 716/132

(58) Field of Classification Search
USPC ............................... 716/54–55, 122, 129, 132
See application file for complete search history.

(56) References Cited

U.S. PATENT DOCUMENTS 7,257,782 B2 * 8/2007 Ho et al. ........................ 716/113
7,701,255 B2 * 4/2010 Cortadella et al. ............. 326/93
7,785,946 B2 * 8/2010 Haffner et al. ................. 438/183
8,099,702 B2 * 1/2012 Hou et al. ...................... 716/131
8,407,544 B2 * 3/2013 Majumdar et al. ............ 714/731

OTHER PUBLICATIONS

Donno et al.; "Power-Aware Clock Tree Planning"; ISPD'04; Apr. 18-21, 2004; Phoenix, Arizona, USA; pp. 138-147.*
Vishweshwara et al., "Clock Tree Considerations for Improved Quality and Robustness", Magma Users Summit on Integrated Circuits, Bangalore, India, Aug. 25, 2011.

* cited by examiner

*Primary Examiner* — Naum Levin
(74) *Attorney, Agent, or Firm* — Robert D. Marshall, Jr.; W. James Brady; Frederick J. Telecky, Jr.

(57) ABSTRACT

Gating clocks has been a widely adopted technique for reducing dynamic power. The clock gating strategy employed has a huge bearing on the clock tree synthesis quality along with the impact to leakage and dynamic power. This invention is a technique for clock gate optimization to aid the clock tree synthesis. The technique enables cloning and redistribution of the fanout among the existing equivalent clock gates. The technique is placement aware and hence reduces overall clock wire length and area. The technique involves employing the k-means clustering algorithm to geographically partition the design's registers. This invention improves the clock tree synthesis quality on a complex design.

4 Claims, 2 Drawing Sheets

PLACEMENT AWARE CLOCK GATE CLONING AND FANOUT OPTIMIZATION

CLAIM OF PRIORITY

This application claims priority under 35 U.S.C. 119(a) to Indian Provisional Application No. 3156/CHE/2011 filed Sep. 14, 2011.

TECHNICAL FIELD OF THE INVENTION

The technical field of this invention is clock circuits for integrated circuit devices. In particular this invention modifies a RTL design into a design having more advantageous clock gating.

BACKGROUND OF THE INVENTION

Disabling the clock signal to the registers in a integrated circuit when they are not in use in a digital synchronous design reduces the active power of the circuit. This clock gating may be implemented in Resistor-Transistor Logic (RTL) by the designer using knowledge of the design's activity. When the data to a register is gated by an enable signal, the design can be converted into a alternative design where the enable signal could be used to gate the clock to the register. This reduces register active power. This process typically receives a RTL design and modifies it to produce a better design for the integrated circuit in power consumption.

Typically clock gates are inserted into an integrated circuit design to save dynamic power on banks of similar registers. These clock gates are typically inserted during synthesis when no placement information is available. Often during timing driven placement the grouping of sinks under clock gates is not optimal. This suboptimality in the clock gates leads to degraded clock tree synthesis quality in clock wire length, insertion delay and clock tree divergence.

FIG. 1 illustrates this idea of converting data gating to clock gating. FIG. 1 illustrates a data gated register circuit 110 and the corresponding clock gated register circuit 150. Date gated register circuit 110 includes multiplexers 111 to 119 and corresponding registers 121 to 129. Clock signal CLK is supplied to a clock input of each register 121 to 129. A first input of each multiplexer 111 to 119 receives the Q output of the corresponding register 121 to 129. A corresponding data input D0 to Dn is supplied to a second input of each multiplexer 111 to 119. An enable signal EN controls the selection input of each multiplexer 111 to 119. The output of each multiplexer 111 to 119 supplies the data input D of the corresponding register 121 to 129. On a first digital state of signal EN, each multiplexer 111 and 119 selects the Q output of the corresponding register. Upon the next pulse of clock signal CLK, this selected signal is supplied to the data input D of each data register 121 to 129. The stores the same contents in each data register 121 to 129 as previously stored. On a second digital state of signal EN opposite to the first state, each multiplexer 111 to 119 selected the corresponding data input D0 to Dn. Upon the next pulse of clock signal CLK, the corresponding data D0 to Dn is stored in data registers 121 to 129.

Clock gated register circuit 150 includes And gate 151 and data registers 161 to 169. A corresponding data input D0 to Dn is supplied to the data input of respective data registers D0 to Dn. Clock signal CLK supplies one input of AND gate 151. Enable signal EN supplies a second input of AND gate 151. When enable signal EN is in the first digital state data registers 161 to 169 are not clocked because AND gate 151 does not pass clock signal CLK to the respective data inputs. Thus the data stored in data registers 161 to 169 is unchanged. When enable signal EN is the in the second digital state AND gate 151 passes the clock signal CLK to the respective clock inputs of data registers 161 to 169. Accordingly, upon the next pulse of clock signal CLK each data register 161 to 169 stores the corresponding data signal.

As shown in the above description data gated register circuit 110 and clock gated register circuit 150 operate similarly relative to the data and clock inputs. These circuits differ because active clock pulses from clock signal CLK are supplied to the data registers only during an active enable EN in clock gated register circuit 150 rather than being continuously supplied as in data gated register circuit 110. Assuming that enable signal EN has an active duty cycle of less than 100%, clock gated register circuit 150 consumes less electric power than data gated register circuit 110.

SUMMARY OF THE INVENTION

This invention is a cloning strategy that is physical placement aware for modification of an integrated circuit design into a form providing better Clock Tree Synthesis (CTS) Quality of Result (QoR). The modified integrated circuit design of this invention also includes a clock gate fanout redistribution technique based on physical proximity of the registers for previously cloned designs.

The design modification method of this invention groups sinks under clock gates taking into account the placement location of the sinks. This invention inserts clones of existing clock gates based on the fanout limit and redistributes the registers to these clones employing a cost function minimizing the bounding box. This invention uses k-means clustering to determine the optimal groups of clock gates and their sinks. This invention determines the location of the clones that ensures good clock tree synthesis quality.

The current available cloning solutions during synthesis use register naming conventions. After timing driven placement registers grouped under the same clock gate could get placed farther from each other making the original grouping sub-optimal. This invention considers the physical location of the registers in determining the grouping.

The design modification method of this invention ensures better placement quality of the clock gates and better clock tree synthesis quality of results.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
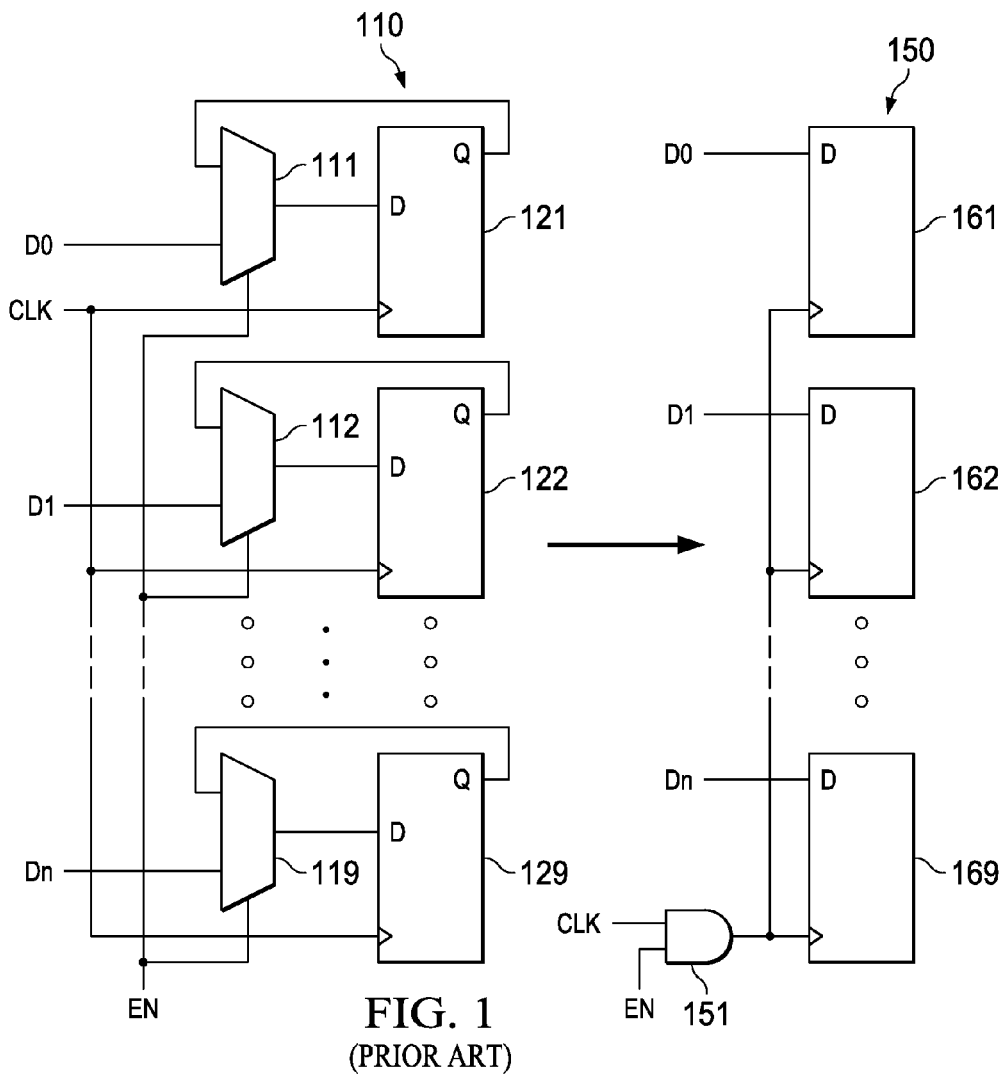
FIG. 1 illustrates a data gated register circuit 110 having a enable signal EN used to gate data and the corresponding clock gated register circuit where the EN signal is used to gate the clock to reduce active power according to the prior art.

Shutting off the clock to a register or a bank of registers when not in a change state is a common but effective practice to reduce dynamic power in an integrated circuit. There are a lot of design considerations during implementation of the clock gates. These are a few critical aspects to be considered in the clock gating strategy:

1. Dynamic power and leakage power tradeoff;
2. Tradeoff between dynamic power savings and setup timing closure to the enable pins; and
3. Effect of clock gating on the clock tree divergence.

Each of these considerations impacts the quality of the clock tree of the integrated circuit in terms of insertion delay, area and divergence. This invention is a physical placement aware technique for modification of an integrated circuit design to clone/redistribute clock fanout among equivalent clock gates. This patent application describes the commonly used methods clock gate physical design with their clock tree synthesis concerns. This patent application details the problem statement. This patent application describes how a k-means clustering algorithm is adapted to clone clock gates and redistribute the fanout among equivalent clock gates for better clock tree synthesis quality. This patent application notes the clock tree synthesis quality improvements observed with the technique of this invention when used on a complex high speed processes subsystem design.

There are current Electronic Design Automation (EDA) tools to identify the data gating scenarios in the RTL and automatically convert them into clock gating circuitry. One consideration when introducing clock gates automatically is the leakage power cost of the clock gates. The leakage power of the clock gate added should not exceed the dynamic power savings the clock gate brings. Thus an inserted clock gate should be gating off a minimum number of registers to save active power.

The higher the fanout of the clock gate, more the dynamic power can be saved. A high fanout requires a buffer tree at the output of the clock gate to efficiently drive the large number of outputs. This makes the insertion delay of the clock gate much less than that of the registers. A clock gate receiving a very early clock could cause difficulties in meeting setup timing at the enable pins of the clock gates.

Placement of the newly inserted clock gates is a critical concern. Suboptimally placed clock gates could lead to increase in the clock tree area and insertion delay when the clock tree is subsequently synthesized. The resulting clock tree would have more divergence and making it vulnerable to on chip variation effects.

A commonly used methodology for clock gate insertion to account for the above care-abouts involves:
1) Inserting clock gates only if it can gate the clock to a minimum set of registers; and
2) Setting a max limit on the fanout of a newly inserted clock gates. This would lead to creating more clones of the clock gate. Typically, clock gating is done on the RTL itself and the partitioning of the registers to the various clones is done heuristically as placement data is not available at that point.

This common method is not placement aware and can cause sub optimal clock gating during layout. Disparate placement of registers of a common bank can limit CTS QoR.

There are some EDA solutions which handle the cloning of clock gates during layout implementation to address this issue. These solutions are generally more focused on the enable timing issues and often cause CTS QoR issues such as an increase in clock gate area and clock insertion delay.

Cloning Clock Gates—Proposed Clock Gating Flow

Figure 2:
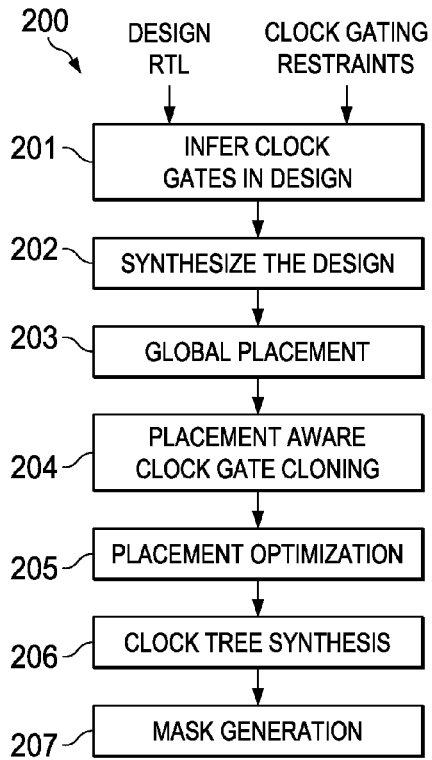
FIG. 2 illustrates a simple clock gate insertion flow.

FIG. 2 illustrates a simple clock gate insertion flow in an integrated circuit manufacture process 200. Step 201 receives as inputs the design RTL and the set of clock gating restraints. Step 201 infers the clock gates in the design. Step 202 synthesizes the design. Step 203 is global placement of the elements in the design. Step 204 performs clock gate cloning while being aware of the placement of step 203. Step 205 performs placement optimization. Step 206 synthesizes the clock tree. The result is design ready for physical implementation. Step 207 generates the masks needed for fabrication of the integrated circuit. There are tools known in the art for producing such masks from the design from step 206. There are numerous constraints on the physical design dependent upon the fabrication facility (Fab) used for manufacture of the integrated circuit. As known in the art, at least the part of the process closely linked to the physical placement of semiconductor regions and connections (metal levels) is optimized for the intended Fab. The masks are used to control the manufacturing processing in the Fab to produce the designed integrated circuit.

This flow involves inserting clock gates in RTL with a suitable minimum fanout limit constraint but with no upper bound on the fanout of the clock gates. When the placement data is available during layout implementation the clock gates can be cloned using this invention (step 204). This invention is thus fully aware of placement ensuring good CTS QoR.

Placement Aware Cloning Algorithm

The cloning of a clock gate involves creating multiple equivalent clock gates and distribution of the fanout of the clock gate among the newly created clock gates. This invention identifies clock gates for cloning if it satisfies any of the following criterions:
i) The fanout of the clock gate is higher than an upper bound; or
ii) The fanout of the clock gate is spread over a large area.

Upon identifying the clock gates to be cloned, the clones are created and the fanout of the parent clock gate is partitioned geographically and assigned to the clock gate and its clones. The invention employs a "k-means algorithm" to partition the registers.

K-means Clustering Algorithm

K-means clustering is a method of cluster analysis which partitions n observations into k clusters in which each observation belongs to the cluster with the nearest mean. The algorithm iteratively refines the clustering and the means to arrive at the cluster partition. Given a set of observations ($x_1$, $x_2$, ..., $x_n$) where each observation is a d-dimensional real vector, k-means clustering aims to partition the observations into k sets (k≤n) S={$S_1$, $S_2$, ... $S_k$} to minimize the within-cluster sum of squares (WCSS):

$$\underset{S}{\operatorname{argmin}} \sum_{i=1}^{k} \sum_{x_j \in S_i} \|x_j - \mu_i\|^2$$

where: $\mu_i$ is the mean of points in $S_i$.

Given an initial set of k means m1, m2, m3, ... mk, the algorithm converges on the partitions by alternating between the following steps.

An assignment step assigns each observation to the cluster with the closest mean. For example, the assignment step partitions the observations according to the Voronoi diagram generated by the means:

$$S_i^{(t)} = \{x_j : \|x_j - m_i^{(t)}\| \le \|x_j - m_{i^*}^{(t)}\| \text{ for all } i^* = 1, \ldots, k\}$$

where: t is the iteration number.

An update step calculates the new means to be the centroid of the observations in the cluster according to the relation:

$$m_i^{(t+1)} = \frac{1}{|S_i^{(t)}|} \sum_{x_j \in S_i^{(t)}} x_j$$

The algorithm is deemed to have converged and ends when the assignments no longer change.

Figure 3:
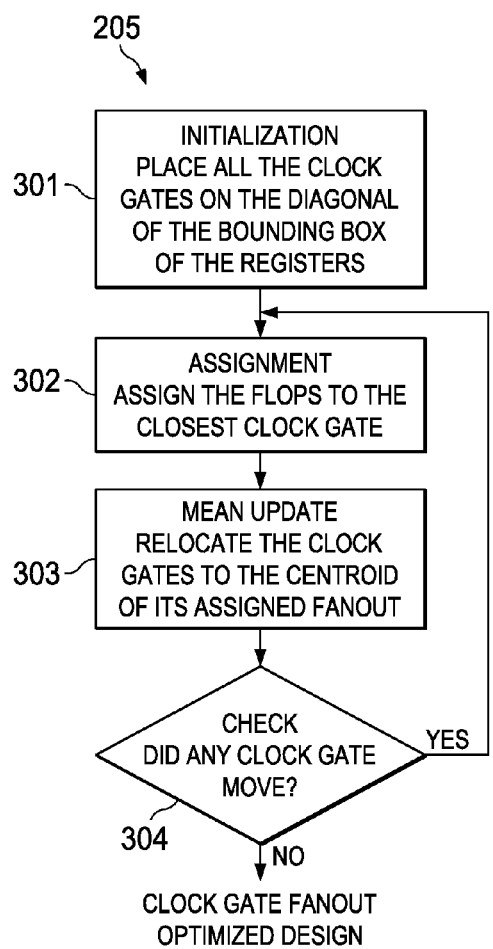
FIG. 3 is a flowchart which describes how the standard k-means algorithm is adopted for partitioning flops under the clock gates/clones.

FIG. 3 is a flowchart which describes how the standard k-means algorithm is adopted for partitioning flops under the clock gates/clones in placement aware clock gate cloning step 204 of FIG. 2.

The K-means algorithm represented by the three equations above can be directly used to physically partition the registers of a design into a few clusters each driven by a clock gate. The observations $x1, x2, \ldots, xn$ is the location of the registers, $S1, S2, \ldots, Sk$ is the k clusters that the registers will be partitioned into and $m1, m2, \ldots, mk$ is the mean location of each cluster where the clock gate of that cluster can be placed.

Step 301 initiates the algorithm. Step 301 places the clock gate and clones on the diagonal of the smallest rectangle containing all the registers in the fanout of the parent clock gate. This is the initial locations of the means for the algorithm.

Step 302 is the assignment step noted above. Step 302 attaches each register to the nearest clock gate. When a clock gate has already reached its fanout limit, step 302 attaches the register to next nearest clock gate.

Step 303 is the update step note above. Once all the registers are assigned to the clock gates, step 303 recalculates the location of the clock gates as the mean location of the assigned registers.

Step 304 determines if the latest iteration of the assignment step (step 302) and the update step (step 303) meet the convergence criteria. This criteria is the following two conditions:

1) No additional were assigned in the last iteration; and
2) No clock gates changed locations.

Step 304 performs this test for every clock gate that has been identified for cloning. If the convergence criteria is not satisfied and a clock gate was moved (Yes at step 304), the algorithm repeats assignment step 302 and update step 303. If the convergence criteria is satisfied and no clock gate was moved (No at step 304), the k-means algorithm ends. The resulting clock placement is the desired clock gate fanout optimized design.

This invention ensures that all clock gates are driving registers that are clustered together on the layout and that the clock gate is placed at the load center of its fanout. The register assignment and clock gate location relocation steps are repeated iteratively to obtain the best physical partition of the registers. This invention makes the clock gating structure very conducive for good CTS QoR entitlement.

Redistribution of Clock Gate Fanout

In cases when the design already has the clock gates cloned during the insertion of clock gates, this invention can be used to find equivalent clock gates and redistribute the fanout among them.

All clock gates driven by the same set of control signal are considered equivalent. The algorithm illustrated in FIG. 3 for partitioning the registers and refining the clock gate placements using the k-means algorithm can be employed.

The inventive flow was used for optimizing the clock gating on a Cortex A8 processor subsystem and the results were bench marked against the other solutions. Table 1 shows the CTS results with the various options.

TABLE 1

| Module | Without any Clock gate optimization | Clock gates cloned using a commercially available EDA tool | Clock Gates cloned and grouped using the proposed technique |
|---|---|---|---|
| Maximum Insertion Delay | 946 ps | 928 ps | 974 ps |
| Global Skew | 83 ps | 65 ps | 75 ps |
| Local Skew | 71 ps | 61 ps | 63 ps |
| CTS Clock Buffer Count | 452 | 128 | 95 |
| CTS Clock Buffer Area | 2801.9376 μ² | 764.1648 μ² | 558.3648 μ² |
| Clock Gate Count | 444 | 1497 | 983 |
| Clock Gate Area | 7010.606 μ² | 12729.2592 μ² | 6715.4304 μ² |
| total cell count | 896 | 1625 | 1078 |
| total area | 9812.5436 μ² | 13493.424 μ² | 7273.7952 μ² |

Table 1 shows that employing this invention results in good CTS area reduction.

The results shown in Table 1 highlight the value the invention brings into the design in terms of clock tree area. This reduces the leakage power of the design. This invention provides area improvement and sets up the design for implementing relative placements for the flops and clock gates. The relative placement is a commonly used practice to reduce leaf clock power and reduce area. Using the inventive flow ensures that the regular placement implementation can be implemented without big register displacements.

What is claimed is:

1. A method of integrated circuit fabrication comprising the steps of:
    receiving a Resistor-Transistor Logic (RTL) design of the integrated circuit;
    receiving a set of clock gating constraints;
    inferring clock gates in the RTL design from the set of clock gating constraints;
    synthesizing the RTL design with the inferred clock gates;
    globally placing the synthesized design;
    performing placement aware clock gate cloning in the globally placed design;
    optimizing placement of the clock gate clones in the globally placed design;
    synthesizing a clock tree from the placement optimized globally placed design;
    generating a corresponding set of masks from the clock synthesized placement optimized globally placed design; and
    employing the set of masks to control manufacturing integrated circuits corresponding to the globally placed design.

2. The method of claim 1, wherein:
    said step of performing placement aware clock gate cloning includes
        placing all clock gates on the diagonal of a bounding box of corresponding registers;
        assigning flops to the closest clock gate;
        relocating clock gates to a centroid of the flops assigned to that clock gate; and
        determining whether any clock gates were moved in said relocating step and repeating said steps of placing, assigning and relocating until no clock gates were moved in said relocating step.

3. The method of claim 2, wherein:
said step of assigning flops to the closest clock gate assigns flops according to a Voronoi diagram generated by the means:

$$S_i^{(t)} = \{x_j : \|x_j - m_i^{(t)}\| \leq \|x_j - m_{i*}^{(t)}\| \text{ for all } i* = 1, \ldots, k\}$$

where: $(x_1, x_2, \ldots x_n)$ is a set of n observations, where each observation is a d-dimensional real vector; $S = \{S_1, S_2, \ldots S_k\}$ is k sets (k≤n) of the observations $(x_1, x_2, \ldots x_n)$; (m1, m2, m3,... mk) is an initial set of k means; and t is an iteration number.

4. The method of claim 3, wherein:
said step of relocating clock gates to a centroid of the flops assigned to that clock gate according to the relation:

$$m_i^{(t+1)} = \frac{1}{|S_i^{(t)}|} \sum_{x_j \in S_i^{(t)}} x_j.$$

* * * * *